US012681849B2

(12) United States Patent　　　(10) Patent No.:　US 12,681,849 B2
Min　　　　　　　　　　　　　　(45) Date of Patent:　　Jul. 14, 2026

(54) NEURAL PROCESSING UNIT INCLUDING MEMORY BANKS ALLOCATABLE WITH DATA BLOCKS OF NEURAL NETWORK MODEL

(71) Applicant: DEEPX CO., LTD., Seongnam-si (KR)

(72) Inventor: Dong Hyun Min, Goyang-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/169,011

(22) Filed: Apr. 3, 2025

(65) Prior Publication Data

US 2026/0072820 A1　　Mar. 12, 2026

(30) Foreign Application Priority Data

Sep. 12, 2024　(KR) ........................ 10-2024-0125108

(51) Int. Cl.
　　*G06F 12/02*　　　　(2006.01)
(52) U.S. Cl.
　　CPC .................................. *G06F 12/023* (2013.01)
(58) Field of Classification Search
　　None
　　See application file for complete search history.

(56) References Cited

U.S. PATENT DOCUMENTS

| | | | | |
|---|---|---|---|---|
| 11,494,321 | B1 * | 11/2022 | Yu | G06F 9/30043 |
| 11,775,268 | B1 * | 10/2023 | Briggs | G06F 8/441 |
| | | | | 717/153 |
| 12,205,013 | B1 * | 1/2025 | Hah | G06N 3/04 |
| 2019/0179795 | A1 * | 6/2019 | Huang | G06N 20/00 |
| 2020/0319861 | A1 | 10/2020 | Lacey et al. | |

| | | | | |
|---|---|---|---|---|
| 2020/0379911 | A1 * | 12/2020 | Wanner | G06F 12/126 |
| 2021/0158132 | A1 * | 5/2021 | Huynh | G06N 3/04 |
| 2022/0004875 | A1 * | 1/2022 | Koike-Akino | G06N 3/045 |
| 2022/0066834 | A1 * | 3/2022 | Wolfe | G06F 8/45 |
| 2022/0138586 | A1 * | 5/2022 | Kim | G06N 3/063 |
| 2023/0005096 | A1 * | 1/2023 | Gurfinkel | G06T 1/60 |
| 2023/0116755 | A1 * | 4/2023 | Linnen | G06F 3/0688 |
| | | | | 711/114 |
| 2023/0297519 | A1 * | 9/2023 | Kim | G06F 13/1668 |
| | | | | 706/15 |
| 2023/0385602 | A1 * | 11/2023 | Park | G06F 3/0625 |
| 2023/0385622 | A1 * | 11/2023 | Park | G06N 3/0464 |
| 2025/0284977 | A1 * | 9/2025 | Li | G06N 3/10 |

FOREIGN PATENT DOCUMENTS

KR　　10-2023-0152645　　　11/2023

OTHER PUBLICATIONS

Xiaofeng Guan et al. "PresCount: Effective Register Allocation for Bank Conflict Reduction" Feb. 8, 2024. 2024 IEEE/ACM International Symposium on Code Generation and Optimization(CGO) pp170-181.
Jeonghun Cho et al. "Fast Memory Bank Assignment for Fixed-Point Digital Signal Processors" ACM Transactions on Design Automation of Electronic Systems, vol. 9, No. 1, Jan. 2004, pp. 52-74.

\* cited by examiner

*Primary Examiner* — Hosain T Alam
*Assistant Examiner* — Ryan Dare
(74) *Attorney, Agent, or Firm* — WTA IP Law P.C.

(57)　　　　　ABSTRACT

A method for controlling a data allocatable neural processing unit is provided. The method may comprise: determining a dependency determination between data blocks of a specific layer of at least one neural network model; allocating memory banks to store the data blocks based on the dependency determination; and storing each data block in the allocated memory bank.

16 Claims, 8 Drawing Sheets

1000

NEURAL PROCESSING UNIT INCLUDING MEMORY BANKS ALLOCATABLE WITH DATA BLOCKS OF NEURAL NETWORK MODEL

CROSS-REFERENCE TO RELATED APPLICATIONS

This application claims the priority of Korean Patent Application No. 10-2024-0125108 filed on Sep. 12, 2024, in the Korean Intellectual Property Office, the disclosure of which is incorporated herein by reference.

BACKGROUND OF THE DISCLOSURE

Technical Field

The present disclosure relates to a data allocatable neural processing unit and a method for controlling the same.

Background Art

Humans are equipped with intelligence that can perform recognition, classification, inference, prediction, and control/decision making. Artificial intelligence (AI) refers to artificially mimicking human intelligence.

The human brain is composed of a multitude nerve cells called neurons. Each neuron is connected to hundreds to thousands of other neurons through connections called synapses. The modeling of the operating principle of biological neurons and the connection relationship between neurons to imitate human intelligence is called an artificial neural network (ANN) model. In other words, ANN is a system in which nodes that imitate neurons are connected in a layer structure.

SUMMARY OF THE DISCLOSURE

Embodiments relate to assigning data blocks for one or more neural networks to memory banks of a neural processing unit. The neural processing unit includes the memory banks for storing data blocks associated with the neural networks. Dependency between the data blocks of a layer of a neural network model is determined. Memory banks are allocated to the data blocks according to the determined dependency between the data blocks. Machine code instructing the neural processing unit to store the data blocks in the allocated memory banks is generated.

In one or more embodiments, determining the dependency includes analyzing relationships of the data blocks based on an input-output dependency between the data blocks. The relationships of the data blocks are represented as a graph. The dependency of the data blocks is determined based on neighboring of the data blocks in the graph.

In one or more embodiments, the dependency is determined by representing relationships of the data blocks using a graph with nodes, each of the nodes representing each of the data blocks, and edges of the graph representing an input-output dependency between the data blocks.

In one or more embodiments, the allocating of the memory banks is performed by determining data blocks having dependency according to the dependency determination; and allocating the data blocks having the dependency to different ones of the memory banks.

In one or more embodiments, the allocating memory banks is performed by representing a status of allocating each data block to one of the memory banks as a node of a graph.

In one or more embodiments, the status of allocation is indicated by at least one of a color, a pattern, a shape, or an index.

In one or more embodiments, allocating the memory banks to the data blocks includes: representing input-output dependency between the data blocks using a graph, determining a number of memory banks for storing the data blocks based on a size of the data blocks for each node of the graph, identifying candidate allocations for the data blocks to each node based on the determined number of memory banks, selecting one of the candidate allocations from the identified allocation candidates based on predefined criteria, and allocating the data blocks to the memory banks according to the selected candidate allocation.

In one or more embodiments, the allocating memory banks to the data blocks is performed by allocating each of the data blocks to each of the memory banks based on predefined criteria. The predefined criteria include at least one of: duplicative clustering results, exceeding storage capacity of each memory bank, and a number of memory copy operations.

DETAILED DESCRIPTION OF THE EMBODIMENT

Figure 1:
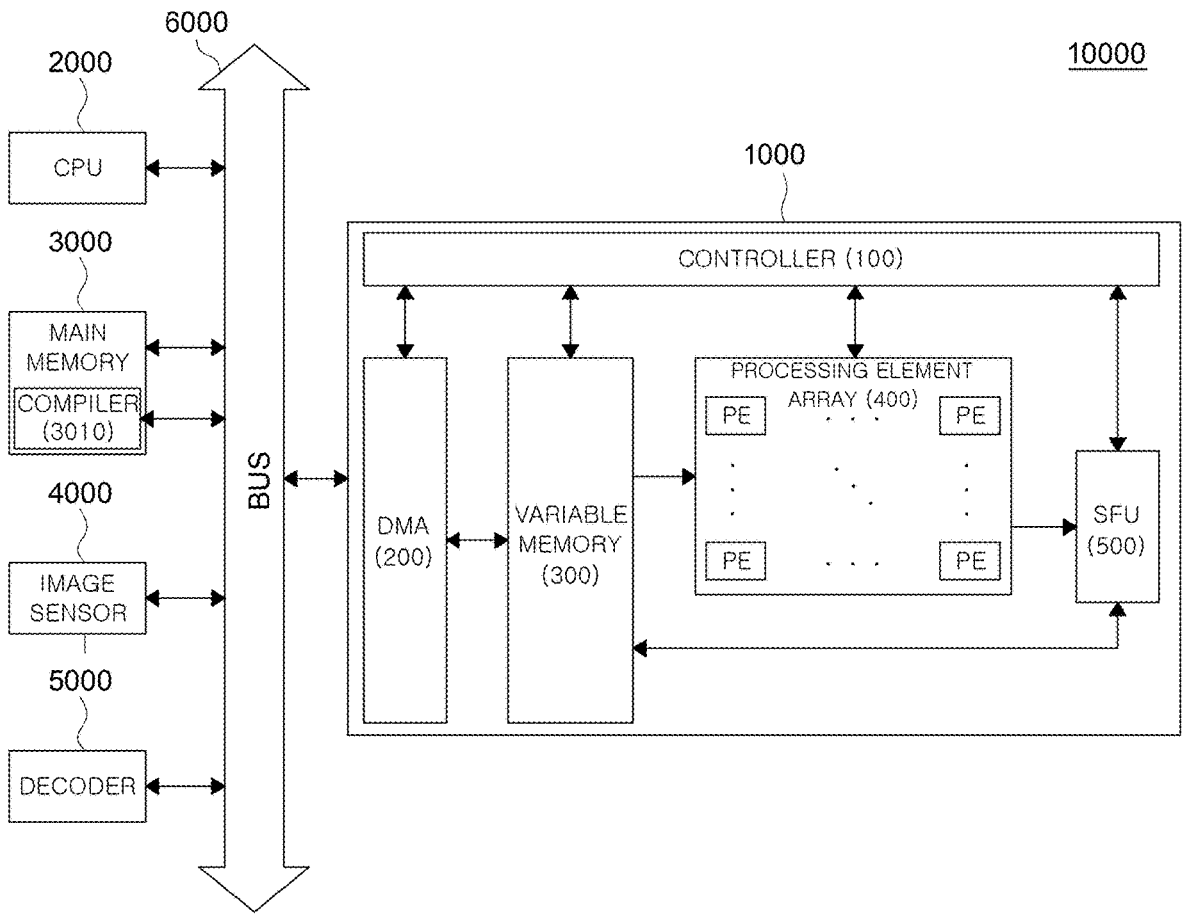
FIG. 1 is a conceptual diagram illustrating a neural processing unit including a variable memory, according to one example of the present disclosure.

Certain structural or step-by-step descriptions of embodiments according to the concepts of the present disclosure disclosed in this specification or application are illustrated by way of example only for the purpose of describing embodiments according to the concepts of the present disclosure.

Embodiments according to the concepts of the present disclosure may be practiced in a variety of forms, and embodiments according to the concepts of the present disclosure may be practiced in a variety of forms and should not be construed to be limited to the embodiments described in this specification or application.

Since embodiments according to the concepts of the present disclosure may be subject to various modifications and may take many forms, certain embodiments are illustrated in the drawings and described in detail in the specification or application. However, this is not intended to limit the embodiments according to the concepts of the present disclosure to any particular disclosed form, and should be understood to include all modifications, equivalents, or substitutions that are within the scope of the ideas and techniques of the present disclosure.

Terms such as first and/or second may be used to describe various elements, but said elements should not be limited by said terms.

These terms are used solely for the purpose of distinguishing one element from another, e.g., a first element may be named as a second element, and similarly a second element may be named as a first element, without departing from the scope of the rights under the concepts of the present disclosure.

When an element is referred to as being "connected" or "connected to" another element, it is to be understood that it may be directly connected or connected to the other element, but that there may be other elements in between. On the other hand, when an element is said to be "directly connected" or "directly attached" to another element, it should be understood that there are no other elements in between.

Other expressions that describe relationships between elements, such as "between" and "directly between" or "adjacent to" and "directly adjacent to" should be interpreted similarly.

In the present disclosure, expressions such as "A or B," "at least one of A and/or B" or "one or more of A or/and B" may include all possible combinations thereof. For example, "A or B", "at least one of A and B" or "at least one of A or B" may refer to both (1) including at least one A, (2) including at least one B, or (3) including both at least one A and at least one B.

As used in this disclosure, expressions such as "first" or "second" may refer to various elements, in any order and/or order of importance, and are used to distinguish one element from another and are not intended to limit such elements. For example, a first user device and a second user device may refer to different user devices, in any order or order of importance. For example, without departing from the scope of the claims herein, the first element may be referred to as the second element, and similarly, the second element may be referred to interchangeably as the first element.

The terms used in this disclosure are intended only to describe certain embodiments and are not intended to limit the scope of other examples.

The singular expression may include the plural unless the context clearly indicates otherwise. Terms used herein, including technical or scientific terms, are intended to have the same meaning as commonly understood by one of ordinary skill in the art described herein.

Terms used in this disclosure that have common dictionary definitions are intended to have the same or similar meanings as they have in the context of the relevant art and are not intended to be interpreted in an idealized or overly formal sense unless expressly defined herein. In some cases, terms defined herein should not be construed to exclude embodiments of the present disclosure.

The terms used in this disclosure are used to describe specific embodiments only and are not intended to limit the present disclosure.

The singular expression includes the plural unless the context clearly indicates otherwise. In this specification, the terms "include" or "have" and the like are intended to designate the presence of the described features, numbers, steps, actions, elements, parts, or combinations thereof, and are not intended to preclude the possibility of the presence or addition of one or more other features, numbers, steps, actions, elements, parts, or combinations thereof.

Unless otherwise defined, all terms used herein, including technical or scientific terms, shall have the same meaning as commonly understood by one of ordinary skill in the technical field to which this disclosure belongs. Such terms, as defined in commonly used dictionaries, are to be construed to have meanings consistent with their contextual meaning in the relevant art and are not to be construed in an idealized or unduly formal sense unless expressly defined herein.

Each of the various examples of the present disclosure may be combined or integrated with each other in part or in whole, and may be entirely or partially interlocked and operated in a variety of ways as will be appreciated by those skilled in the art, and each example may be practiced independently of or in conjunction with each other.

In describing each example, technical details that are well known in the art and not directly related to the present disclosure are omitted. This is done to make the disclosure clearer without obscuring the main points of the disclosure by omitting unnecessary explanations.

Examples of the present disclosure are hereinafter described in more detail with reference to the accompanying drawings.

Definitions of Terms

To facilitate understanding of the present disclosure, the following is a brief summary of terms used herein.

NPU: Abbreviation for neural processing unit, which may refer to a processor specialized for computing a neural network model independent of a central processing unit (CPU).

NN: Abbreviation for neural network, a network of nodes connected in a layer structure, mimicking the way neurons in the human brain are connected through synapses, to mimic human intelligence.

Information of a neural network model: information about the structure of the network, information about the number of layers, information about the connection relationship of each layer, information about the parameters of each layer, information about the computational processing method, information about the activation function, the data type of the parameters of each layer (e.g., floating-point or integer), and the bitwidth of each parameter. The parameters of each layer may be represented by a tensor of a certain size. In a compilation step, the at least one layer may be partitioned into tiled tensors according to the calculation circuit architecture and internal memory size. Based on the parameter size of each tensor (such as the size of the input parameters and the size of the weight parameters) and the required computation algorithm (such as matrix multiplication, activation function, and softmax function), the clock cycles of the calculation circuit required to process the tensor and the data transfer clock cycles required to transfer to the memory may be calculated.

DNN: Abbreviation for deep neural network, which can refer to an increase in the number of hidden layers of a neural network to achieve higher artificial intelligence.

CNN: Abbreviation for convolutional neural network, a neural network that functions similarly to the visual cortex of the human brain in processing images. Convolutional neural networks are known to be well-suited for image processing and are known for their ability to extract features from input data and identify patterns in the features.

Transformer: The transformer neural network is a DNN based on attention techniques. It utilizes many matrix multiplication operations. A transformer can take an input value and parameters such as query (Q), key (K), and value (V) to obtain an output value, an attentions (Q, K, V). Based on the output value (i.e., the attentions (Q, K, V)), the transformer can process various inference operations. Transformers are actively utilized in language generation models.

Kernel: Refers to the weights of the N x M matrix of convolutions. Each layer of the neural network model has a plurality of kernels, and the number of kernels may be referred to as the number of channels, the number of filters, and the like.

Tensor: A tensor is a multidimensional matrix parameter processed by a neural network model. A tensor can refer to various parameters of a neural network model, such as weights, feature maps, kernels, and attention parameters. A tensor may refer to an input parameter input to a neural processing unit and an output parameter computed by a neural processing unit. A tensor may be a parameter of one tile that is computed by the neural processing unit at a time. The neural network model may comprise a plurality of layers, and each layer may be configured to include at least one tensor. For example, an input parameter of a first layer of the neural network model may be referred to as a first tensor, a weight parameter of the first layer may be referred to as a second tensor, and an output parameter of the first layer may be referred to as a third tensor. For example, the input parameters of the first layer of the first neural network model may be referred to as the first tensor, and the input parameters of the first layer of the second neural network model may be referred to as the second tensor.

Neural network (NN) models are divided into "single-layer neural network" and "multi-layer neural network," according to the number of layers. A typical multi-layer neural network consists of an input layer, a hidden layer, and an output layer. The input layer is a layer that receives external data, and the number of input layers is the same as the number of input variables. The hidden layer is located between the input layer and the output layer, and is a layer that receives signals from the input layer, extracts features, and transfers them to the output layer. The output layer is a layer that receives signals from hidden layers and outputs them to the outside.

When a signal is transmitted between neurons in the human brain, the transmission strength of the signal varies. By imitating this, the transmission strength of a signal transmitted between layers, that is, activation, is determined by an activation function in the NN.

Depending on the characteristics of the activation function implemented in the NPU, the inference accuracy of the NN may vary. That is, the performance and efficiency of the NN are determined according to the hardware implementation characteristics of the NPU's activation function processing circuit. In addition, NNs that handle complex mathematical activation functions can be processed by hardware accelerators. When implementing an NN-specific processor in hardware, an NN-specific processor may require significant chip area (i.e., a large number of logic gates). Also, these chips can exhibit significant power consumption.

A deep neural network (DNN) refers to an NN with an increased number of hidden layers to implement higher artificial intelligence. The activation function of the DNN is used to determine the transfer strength for computed values with weights and biases applied. DNNs are being developed in various structures.

For example, a convolutional neural network (CNN), which is an example of a DNN, is known to be easy to extract features of an input value (i.e., video or image) and identify a pattern of the extracted features. A CNN may be configured in a form in which a convolution operation, an activation function operation, a pooling operation, and the like are processed in a specific order.

For example, in each layer of a DNN, input values and parameters (i.e., weights or kernels) may be a matrix composed of a plurality of channels. Input values and parameters can be processed in the NPU by convolution or matrix multiplication. Calculation values are generated after calculations are processed in each layer. An activation function may be applied to these calculated values.

For example, a transformer is a DNN based on attention technology. Transformers utilize a number of matrix multiplication operations. The transformer may obtain an operation value of attention (Q, K, V) by using parameters such as an input value and a query (Q), a key (K), and a value (V). The transformer may process various inference operations based on the operation value (i.e., attention (Q, K, V)). Transformers tend to show better inference performance than CNNs.

There are several types of deep neural networks (DNNs), which increase the number of hidden layers to achieve higher artificial intelligence in multi-layer neural networks. On the other hand, a convolutional neural network (CNN) is known for its ability to extract features from input data and identify patterns in the extracted features. A convolutional neural network (CNN) is a neural network that performs functions similar to those of the visual cortex of the human brain in processing images. CNNs are known to be suitable for image processing. A convolutional neural network is composed of repeating convolutional channels and pooling channels.

In a CNN, most of the computation time is spent on the convolution operation. A CNN extracts the features of the image in each channel by the kernel in the form of a matrix and recognizes objects by providing a constant such as movement or distortion through pooling. Each channel obtains a feature map by convolving the input data with the kernel (i.e., a convolution operation) and then applies an activation function such as rectified linear unit (ReLU) to generate an activation map for that channel. After that, pooling can be applied. The neural network that actually classifies the patterns is located at the end of the feature extraction neural network and is called the fully-connected layer. In the operation processing of the convolutional neural network, most of the operations are performed through convolutions or matrix multiplications.

As the ability of AI inference improves, AI are being used in a wide range of electronic devices, including, but not limited to, AI speakers, smartphones, smart refrigerators, VR devices, AR devices, AI CCTV, AI robot vacuum cleaners, tablets, laptop computers, self-driving cars, bipedal robots, quadrupedal robots, and industrial robots, for tasks such as sound recognition, voice recognition, image recognition, object detection, driver drowsiness detection, dangerous moment detection, and gesture detection. These devices provide various inference services.

With the recent development of deep learning technology, the performance of neural network inference services based on big data training is improving. These neural network inference services train a neural network with a large amount of training data repeatedly and infer various and complex data through the trained neural network model. Therefore, various services are being provided to the aforementioned electronic devices using neural network technology.

In addition, neural processing units (NPUs) are being developed to accelerate the speed of computation for artificial intelligence. However, as the functions and accuracy required for inference services using neural networks are increased, the data size, computational load, and the size of the training data of the neural network model are increased exponentially. Therefore, the performance of processors and memory that handle the inference operations of these neural network models is gradually increasing.

Recently, with the development of deep learning technology, the performance of neural network inference services based on big data training has been improving. These neural network inference services train a neural network with a large amount of training data repeatedly and infer various and complex data through the trained neural network model. Therefore, various services are being provided to the aforementioned electronic devices using neural network technology.

However, as the functions and accuracy for inference services using neural networks are increased the data size, computational load, and the size of the training data of the neural network model are increasing exponentially. Therefore, the required performance of processors and memory that can handle the inference operations of these artificial neural network models is gradually increasing, and neural network inference services are being actively provided on cloud computing-based servers that can easily process big data.

In particular, such issues can be exacerbated in various electronic devices used for edge computing. Edge computing refers to the edge, or periphery, where computing takes place, and it refers to the various electronic devices that directly produce data or are located in close proximity to the devices. Edge computing can be referred to as an edge device. To elaborate, a computing system that is separated from the servers in the data center in a cloud computing system and is located at the edge of the cloud computing system and communicates with the servers in the data center can be defined as an edge device. Edge devices can also be used to perform tasks that require immediate and reliable processing of vast amounts of data within $\frac{1}{1,000}$ of a second, such as autonomous robots and autonomous vehicles. As a result, the number of applications for edge devices is rapidly increasing.

To this end, neural network models are used in various edge devices. Meanwhile, multiple neural network models can be used according to the type of edge device. If a separate neural processing unit is used for each neural network model, the time that the neural processing unit exists in an idle state increases, resulting in increased inefficiency. In addition, if the computation of multiple neural network models is performed using a single neural processing unit, the computation time increases unless an efficient computation order is established between multiple neural network models. Therefore, there are various difficulties in improving the computational processing performance of neural network models and the lightweighting of neural network models to investigated improve these problems.

The present disclosure relates to a neural processing unit that includes a neural network memory system for processing neural network models. The neural processing unit performs matrix multiplication, convolution, activation function, pooling, striding, batch normalization, skip connection, concatenation, quantization, clipping, padding, and other operations required for the above-mentioned neural network operations. It can be configured to include each processing circuit efficient for SoftMax calculations. For this purpose, the neural processing unit (NPU) includes processing elements that perform the product operation and memory that stores the data required for the product operation. The memory of the neural processing unit may need to store the input feature map, weight, and output feature map. The feature map and weight may refer to a specific domain of the parameters of the neural network model.

On the other hand, the hardware for implementing a neural processing unit (NPU) may be an application-specific integrated circuit (ASIC) dedicated to artificial intelligence. In an ASIC dedicated to artificial intelligence, the area in which memory is formed may be limited in order to secure an area in which processing elements are formed.

In particular, reducing the memory capacity of the neural processing unit implemented in the ASIC for artificial intelligence can reduce the production cost of the ASIC for artificial intelligence and improve the productivity of the ASIC for artificial intelligence.

However, as the capacity of the memory of the ASIC dedicated to artificial intelligence decreases, there is less space to store the feature map and weights in the dedicated ASIC, and as a result, the feature map and weights may be stored by tiling them at a higher frequency in the main memory.

As the amount of data transfer between the ASIC dedicated to artificial intelligence and the main memory increases, the power required by the system increases sharply, the number of direct memory access (DMA) operations and the DMA overhead attributable to the number of operations increase, and the delay of the operations performed inside the neural processing unit increases.

On the other hand, if the memory of an ASIC dedicated to artificial intelligence had a conventional single domain, the memory of the ASIC dedicated to artificial intelligence could not efficiently provide feature maps and weights to the processing element.

To elaborate, the memory of a conventional single domain can provide one cycle of weight data to one processing element and then provide one cycle of input feature map data to that processing element at the next cycle. At the next cycle, the memory of a conventional single domain can receive one cycle of output feature map data from the processing element. In other words, according to the above memory structure, a processing element can process one multiply and accumulate (MAC) operation after three clocks. Therefore, conventional single-domain memory can be inefficient for neural network operations in terms of processing speed, leading to the implementation of multidomain memory to provide feature maps and weights at the same time.

However, if independent feature map memory and weight memory are implemented inside the memory of an ASIC dedicated to artificial intelligence, the memory capacity of each domain is fixed. On the other hand, when the structure of a neural network model is analyzed, each layer of the neural network model has feature maps of different sizes and weights of different sizes. Data from a specific domain may not be stored in the memory of another domain. In other words, the utilization rate (%) of multi-domain memory of an ASIC dedicated to artificial intelligence may be significantly reduced according to the structure of the neural network model.

Therefore, effectively controlling the memory of multiple domains during the computation of a neural network model may lead to improving the speed of neural network computation. If memory control is not properly performed when training or inferring a neural network model, the required data may not be prepared in advance, which may frequently result in a reduction in effective memory bandwidth and/or a delay in the supply of data to the memory. In such cases, the processor would be in a starvation or idle state, unable to receive data to process, and thus unable to perform actual calculations, resulting in a decrease in computational performance.

Furthermore, the computational processing sequence of such a neural network model has the property of maintaining neural network data locality for the iterative training and/or inference operations of the neural network model given to the processor. Accordingly, if the data locality of the neural network model is maintained, the processing sequence of the data for the neural network computation processed by the processor is sorted and maintained in units of words, and such information can be provided or analyzed and used for neural network computation. To elaborate, a word unit of the processor refers to the element unit, which is the basic unit that the processor is capable of processing. For example, when a neural processing unit processes multiplication of N-bit input data and M-bit kernel weights, the input data word unit of the processor may be N-bit and the word unit of the weight data may be M-bit. The word units of the processor can be set differently according to the layers, feature maps, kernels, activation functions, etc. of the neural network model. Therefore, sophisticated memory control technology is performed for the operation of each word unit.

Moreover, the neural processing unit may include variable memory in which multiple word lines are gathered to form a single memory bank (or memory unit). When reading or writing data that exists in this variable memory, constraints on simultaneous access to be prevented on a memory bank basis. Avoiding collisions between memory banks at certain points in a computing cycle is the key to improving the use of neural network memory.

The present disclosure provides a data allocatable neural processing unit and a control method thereof that can reduce unnecessary computing cycle consumption by placing data with inter-layer input/output dependencies in different memory banks to avoid collisions between memory banks for precise memory control.

FIG. 1 is a conceptual diagram illustrating a neural processing unit including a variable memory according to one example of the present disclosure. In FIG. 1, a neural processing unit including a variable memory is illustrated, as well as a plurality of peripheral devices for the operation of the neural processing unit. Accordingly, the neural processing unit and the plurality of peripheral devices may be referred to as a system. At least some of the components of the system may be configured as a system-on-chip (SoC).

As shown in FIG. 1, the NPU 1000 may be configured to perform various neural network inference functions by communicating with the central processing unit (CPU) 2000, memory 3000, image sensor 4000, and/or decoder 5000. The NPU 1000 may be composed of a plurality of units, in which case each NPU 1000 may be controlled via the integrated controller 1100.

Each of the plurality of NPUs 1000, a CPU 2000, a memory 3000, an image sensor 4000, and/or a decoder 5000 may be formed as an independent circuit, but is not limited thereto.

According to various examples, the NPU 1000 may comprise circuits formed on the same semiconductor die as the CPU 2000.

According to various examples, the NPU 1000, the CPU 2000, and the main memory 3000 may be configured as circuits formed on the same semiconductor die.

According to various examples, the NPU 1000 may comprise a CPU 2000 and semiconductor dies connected by chiplet technology. If chiplet technology is applied, an interposer may be further included.

According to various examples, at least one among the NPU 1000, the CPU 2000, and the main memory 3000 may be composed of semiconductor dies connected by chiplet technology.

Each of the above-mentioned elements may be implemented as a circuit board, a silicon substrate, a resistive element, a transistor, and the like. Therefore, each element may be a semiconductor circuit with numerous transistors connected thereto, some of which may be difficult to identify with the naked eye and can only be identified by their operation. Therefore, each of the elements in FIG. 1 can be referred to as a corresponding circuit unit.

Each of the aforementioned CPU 2000, memory 3000, image sensor 4000, and decoder 5000 can communicate via the bus 6000 to transmit data with the NPU 1000. According to an example of the present disclosure, the bus 6000 may be an Advanced extensible Interface (AXI) bus. However, present disclosure is not limited thereto, and the NPU 1000 may be configured to be directly connected to at least one of the aforementioned components.

The NPU 1000 may be defined as a specialized processor for the operation of a neural network model. In particular, the NPU 1000 may be specialized for matrix-product or product operations, which account for most of the computational load in a neural network model.

The neural network model is based on a neural network, which is a network of artificial neurons that receive multiple inputs or stimuli, multiply them by weights, add them, and apply an activation function to transform and transmit the resulting values. The neural network model can be used to output inference results from the input data.

The NPU 1000 may be a semiconductor implemented as an electrical/electronic circuit. Electrical/electronic circuits may include a number of electronic elements (e.g., transistors, capacitors).

In the case of a neural network model based on a transformer and/or CNN, the NPU 1000 may selectively process matrix multiplication operations, convolutional operations, and the like according to the architecture of the neural network.

For example, in each layer of a convolutional neural network (CNN), the input feature map corresponding to the input data and the kernel corresponding to the weights may be matrices comprising a plurality of channels. A convolutional operation on the input feature map and the kernel may be performed, and a convolutional operation on each channel and a pooled output feature map may be generated. An activation function may be applied to the output feature map to generate an activation map of the corresponding channel.

Pooling may then be applied to the activation maps. The activation maps may be collectively referred to herein as the output feature maps.

However, the examples of the present disclosure are not limited thereto, and the output feature map may be referred to as matrix multiplication or convolution has been applied. The input feature map may be referred to as the input tensor. The weight may also be referred to as the input tensor. The output feature map may be referred to as the output tensor.

Furthermore, an output feature map according to the examples of the present disclosure should be interpreted in a comprehensive sense. For example, the output feature map may be the result of a matrix multiplication operation or a convolution operation. Accordingly, the plurality of processing elements (PEs) included in the processing elements 400 may be modified to further include processing circuit units for additional algorithms.

In some examples, it is also possible to modify a processing element array into an adder tree.

The NPU 1000 may be configured to include a plurality of processing elements (PEs) for processing convolutional and matrix multiplication required for the neural network operations.

The NPU 1000 may be configured to include respective calculation circuits optimized for matrix multiplication operations, convolutional operations, activation function operations, pooling operations, stride operations, batch-normalization operations, skip-connection operations, concatenation operations, quantization operations, clipping operations, padding operations, and softmax operations required for the neural network operations.

For example, the NPU 1000 may be configured to include a special function unit (SFU) 500 for processing at least one of the above-described algorithms: an activation function operation, a pooling operation, a stride operation, a batch-normalization operation, a skip-connection operation, a concatenation operation, a quantization operation, a clipping operation, a padding operation, and a softmax operation.

The NPU 1000 may include a controller 100, a direct memory access (DMA) 200, a variable memory 300, a plurality of processing elements 400, and a special function unit 500. In addition to this, the NPU 1000 may include additional functional units.

The elements of the NPU 1000 are distinguished by their operation functions, and each element may be formed utilizing at least one of a substrate, a resistive element, and a transistor. Thus, each element may be a semiconductor circuit with numerous transistors connected thereto, some of which may be difficult to identify and distinguish with the naked eye and may be identified only by their operation. Accordingly, each functional unit of the NPU 1000 may be referred to as a circuit unit.

The controller 100 may be configured such that each of the DMA 200, the variable memory 300, the plurality of processing elements 400, and the special function unit 500 controls the operation related to the computation of the neural network model. The controller 100 may be directly or indirectly connected to each of the DMA 200, the variable memory 300, the plurality of processing elements 400, and the special function unit 500 so that they can communicate with each other. For example, the controller 100 may adjust the capacity for each domain of the variable memory 300 based on the capacity of the variable memory 300.

The controller 100 may be configured to control the NPU 1000 based on the machine code (e.g., binary code) of the compiled neural network model. For example, the compiler executed by the CPU 2000 may determine the hardware characteristics of the NPU 1000, such as the number of processing elements, the capacity of memory, the functions provided by the special function unit, and/or the presence of a post-processing unit. Based on such determination, CPU 2000 may generate machine code that defines the read/write sequence of the data in the neural network model, the processing sequence of the layers in the neural network, the sequence of the convolution operations, the sequence of the matrix multiplication operations, and the read and write operation sequence of the data in the DMA. Accordingly, the machine code compiled by the CPU 2000 may be executed by the controller 100 to control the operations of the NPU 1000.

In some examples, the CPU 2000 may dynamically generate machine code and provide the generated machine code to the NPU 1000 during the runtime of the inference phase. Such dynamic generation of machine code may be efficient for computation of neural networks with the size of its specific tensors varying dynamically.

The controller 100 may obtain schedule information that define a sequence of operations associated with the neural network model to be performed by the NPU 1000 based on the directed acyclic graph (DAG) of the neural network model compiled by the compiler. The compiler may determine an operation schedule that can accelerate the operation of the neural network model by determining the number of processing elements (PEs) of the NPU 1000, the size of the variable memory 300, the size of the parameters of each layer of the neural network model, and the like. According to the computation schedule, the controller 100 may control a corresponding number of PEs for each computation step and control the read and write operations of the parameters associated with the variable memory 300 for each computation step. The compiler may efficiently schedule the computation steps according to the hardware architecture and capability of the NPU 1000. The compiler may determine the order of data for performing computation associated with the neural network model based on the sequence of operations of the layers, convolutions, and/or matrix multiplications of the neural network, and may generate the compiled machine code.

In some examples, the NPU 1000 may be configured to include an embedded compiler. According to the configurations described above, the NPU 1000 may be configured to generate machine code upon receiving one or more input of files in the form of frameworks of various AI software. For example, frameworks of AI software may include TensorFlow, PyTorch, Keras, XGBoost, mxnet, DARKNET, ONNX, and the like.

The DMA 200 may be configured such that the NPU 1000 accesses and reads and/or writes to main memory 3000 and the like. The NPU 1000 can read data related to the neural network model from main memory 3000 via DMA 200. The main memory 3000 can be built into the system-on-chip (SoC) or configured as a separate memory device.

The DMA 200 may be connected to the variable memory 300 and may control the read or write operation of each memory unit by allowing the weight or feature map to be accessed from each memory units configuring the variable memory 300.

The variable memory 300 may be placed in the on-chip area of the NPU 1000 and perform caching or storing of data processed in the on-chip area. The variable memory 300 may also be referred to as cache memory or internal memory. The variable memory 300 can read, from the memory 3000, and store at least some of the data for performing the operations associated with the neural network model. The variable memory 300 can be configured to store all or part of the neural network model according to the memory capacity settings of each parameter and the data size of each layer of the neural network model. The parameters of the typical data processed in the neural network model may include, but are not limited to, Query (Q), Key (K) and Value (V) related to attention, KV cache, activation maps, input feature maps, output feature maps, and weights.

Specifically, the variable memory 300 may read and store parameters corresponding to input data from the memory 3000. Additionally, the variable memory 300 may read and store parameters corresponding to output data from the plurality of processing elements 400. In addition, the parameters included in the neural network model may include input values and weights. The input values or output values read or written by the variable memory 300 may include at least one of activation parameters, feature map parameters, KV cache parameters, attention parameters, and the like.

The variable memory 300 may comprise at least one of memories such as a register file, read-only memory (ROM), SRAM, dynamic random-access memory (DRAM), Resistive RAM, Magneto-resistive RAM, Phase-change RAM, Ferroelectric RAM, Flash Memory, high-bandwidth memory (HBM), and the like. According to one example of the present disclosure, the variable memory 300 may be embodied as SRAM, which is advantageous in terms of computational processing speed. Further, the variable memory 300 may be organized into at least one memory unit (e.g., a bank and the like.). The variable memory 300 may comprise homogeneous memory or heterogeneous memory. In other words, each memory unit of the variable memory 300 may store an input feature map, weights, or an output feature map.

Further, the data (e.g., the parameters of the neural network model) stored in the memory units of the variable memory 300 may not be fixed to one of the attention, the KV cache, the activation map, the input feature map, the weights, and the output feature map, but may be changed to another one of the attention, the KV cache, the activation map, the input feature map, the weights, and the output feature map as needed. In other words, by varying the memory allocation of the variable memory 300, the utilization efficiency of the variable memory 300 may be improved. For example, the allocation of data to the variable memory 300 may vary depending on the data size of each parameter stored in the variable memory 300 at each operation step.

The processing elements 400 may be configured to include a plurality of processing elements performing multiplication and accumulation (MAC) operations. This plurality of processing elements 400 or processing element array may also be referred to as an artificial intelligence (AI) computing unit.

Each element of the processing elements 400 may be configured to perform operations by receiving an input, such as an input feature map corresponding to input data and/or a kernel corresponding to weights for the neural network, and the parameters may be referred to as tensors. A processing element may be configured to perform addition, multiplication, accumulation, and the like functions required for processing the neural network model. To this end, each processing element may include at least one of a MAC (multiply-and-accumulate) operator, an adder tree, and an ALU (arithmetic logic unit) operator. For example, the processing element may perform a convolution operation on the input feature map and the weight and output the output feature map. In other words, the output feature map can be the result of a convolution, but the examples of the present disclosure are not limited thereto, and the output feature map can be output by selectively applying one or more of an activation function operation, a pooling operation, a stride operation, a batch-normalization operation, a skip-connection operation, a concatenation operation, a quantization operation, a clipping operation, a padding operation, and a softmax operation to the result of the convolution.

As another example, a processing element PE can perform a general matrix multiply (GEMM) operation or a matrix multiplication operation using the input feature map and weight to output the output feature map. More specifically, the processing element PE can output an output feature map of a certain matrix-shape by multiplying a matrix-shaped input feature map with a weight matrix and adding a bias to it. In particular, matrix multiplication in the NPU can be performed at high speed through parallel processing by multiple processing elements, enabling efficient processing of matrix multiplication operations.

As another example, a processing element PE can be configured as a circuit designed to accept only integer-type parameters. In this case, the input parameters of the processing element PE may be converted to integers of a specific bitwidth and stored in variable memory 300. Such configuration effectively reduces power consumption compared to processors that support floating-point and may be easily implemented on-device.

The special function unit 500 can process various activation functions to give nonlinearity to the output feature map. The activation function processed by the special function unit 500 may include, but is not limited to, a SiLU function, a Softmax function, a sigmoid function, a hyperbolic tangent (tanh) function, a ReLU function, a Leaky ReLU function, a Maxout function, or an ELU function that derives a nonlinear output value for an input value. It may be technically difficult to support all activation functions in the NPU 1000. Therefore, the NPU 1000 may approximate various activation functions through a piecewise linear function approximation algorithm with a piecewise linear function processing circuit. These activation functions can be selectively applied after the MAC operation. Operation value applied with the activation function may be referred to as an activation map. In addition, the special function unit 500 may be configured to include a floating-point multiplier circuit that performs floating-point calculations.

As another example, a special function unit 500 may comprise a circuit configured to communicate with a processing element PE and designed to receive an integer-type parameter from the processing element PE. The special function unit 500 may be configured to further include a dequantization circuit configured to convert an integer type parameter into a floating-point type parameter, and the special function unit 500 may be configured to process activation function calculations with floating-point type parameters. The special function unit 500 can also be configured to include a quantization circuit configured to convert floating-point type parameters after activation function calculations have been completed to integer type parameters. According to the above configuration, the special function unit 500 may handle floating-point operations by inverting the integer parameters when floating-point operations are performed, and then quantizing the results again. In other words, the NPU according to an example of the present disclosure includes a processing element circuit configured to process integer-type parameters and a special function circuit unit pipelined therewith, and the special function circuit unit may include a quantization circuit and a dequantization circuit and can be configured to process activation function operations with floating-point-type parameters. According to the above configuration, the special function unit 500 effectively communicates with the processing element PE that supports only integer parameters, and directly converts and processes the types of parameters without using any circuits outside the NPU.

The controller 100 may recognize the area, position, address, and the location where the output feature map is stored in the variable memory 300. Accordingly, the controller 100 may control the variable memory 300 so that the output feature map stored in the variable memory 300 is reused as the input feature map for operations of the subsequent layer.

The controller 100 may execute machine code generated based on the structure of the variable memory 300 of the NPU 1000 (e.g., the capacity and number of each of the plurality of memory units) and the size information of each layer of the neural network model (e.g., the size of the weights of each layer and the size of the feature map) to control the variable memory 300. That is, based on the structure of the variable memory 300 and the structure of the neural network model, the controller 100 may schedule read or write operations of the DMA 200 such that specific data of a particular layer is accessed at a particular memory unit of the variable memory 300. The scheduling may include data locality with respect to computational steps of at least two layers.

As described further below, the controller 100 may schedule domain allocations of memory units of the variable memory 300 for data reuse based on the analysis of the computation sequence of the plurality of layers of the neural network model and their data locality.

The main memory 3000 may store data required for computing the neural network model. The main memory 3000 may comprise one of memories such as ROM, SRAM, DRAM, Resistive RAM, Magneto-resistive RAM, Phase-change RAM, Ferroelectric RAM, Flash Memory, HBM, and the like, but it is advantageous in terms of data storage capacity to comprise DRAM. The main memory 3000 may comprise at least one memory unit. The main memory 3000 may comprise homogeneous memory units or heterogeneous memory units. The main memory 3000 may store at least one neural network model. The main memory 3000 may be provided with weights of at least a portion of a layer of the neural network model to be processed by the NPU 1000. The NPU 1000 may alternately process different neural network models.

In one or more embodiments, the main memory 3000 further stores software components that may be executed by the CPU 2000. One of the software components is a compiler 3010 that generates machine code to be executed by the NPU 1000 to control and coordinate operations of its component.

The neural network model processed by the NPU 1000 may be a deep neural network model. Accordingly, the neural network model may include a plurality of layers, each of which may include a feature map and a tensor corresponding to respective weights.

The image sensor 4000 may generate light entering through the lens as image or video data, and the generated image or video data may be used as an input feature map for the neural network model. The image sensor 4000 may be at least one, and may be configured to have multiple image sensors, for example, in the case of an autonomous vehicle.

The decoder 5000 may decode a feature map or weights of an encoded bit stream, and the decoded input feature map or weights may be used as input to a neural network model. The bit stream may be a bit stream corresponding to an MPEG standard, wherein the MPEG standard may be, for example, MPEG-VCM (video coding for machine) or MPEG-NNC (neural network compression).

Figure 2:
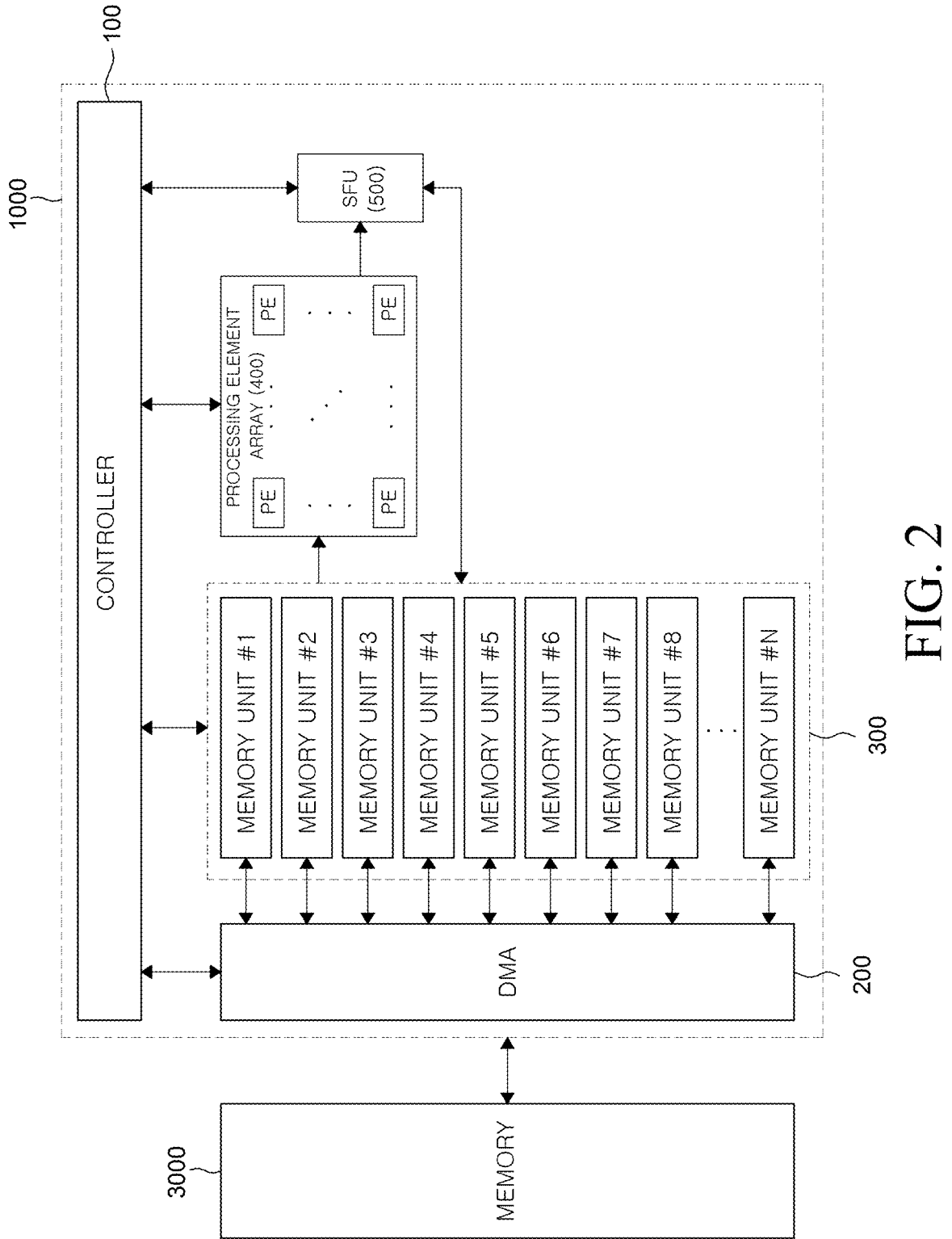
FIG. 2 is a block diagram illustrating the configuration and operation of the variable memory included in the neural processing unit, according to one example of the present disclosure.

FIG. 2 is a block diagram illustrating the configuration and operation of the variable memory included in the NPU according to one example of the present disclosure. Referring to FIG. 2, the variable memory 300 may include memory unit #1 through memory unit #N. According to examples of the present disclosure, each memory unit of the variable memory 300 may be referred to as a "memory bank."

At least one of the N memory units may store at least one of an input feature map, an output feature map, or weights. The set of memory units of the variable memory 300 stored with an input feature map or output feature map is referred to as a "feature map memory." The set of memory units stored with an input feature map is referred to as an "input feature map memory," while the set of memory units stored with an output feature map is referred to as an "output feature map memory." The set of memory units stored with weights is referred to as a "weight memory." At least one of the plurality of memory units #1 through #N may be one of a weight memory, an input feature map memory, and an output feature map memory. However, this is merely one example, and the variable memory 300 may also store input feature maps and/or output feature maps in one memory bank, each with weights.

According to examples of the present disclosure, the input feature map memory, the output feature map memory, and the weight memory refer to memory that is variably allocated to each domain for each computation step. For example, the first domain may correspond to an input feature map parameter, the second domain may correspond to an output feature map parameter, and the third domain may correspond to weight parameters. The number of memory units allocated to each domain for each computation step may also be variable.

At least one memory unit may be allocated to each domain to store the parameters corresponding to a particular domain for computing the layers of the respective neural network model. In one or more embodiments, the ratio of memory space allocated to the weight tensor to memory space allocated to the feature map tensor may vary for each computation step, i.e., the number of memory units allocated to the weight domain and the number of memory units allocated to the feature map domain for each layer, tile, or tensor of the respective neural network model may vary for each computation step. In this case, the capacity of each of the memory units may be the same. For example, the capacity of each memory unit of the variable memory 300 may be 1 KByte, 2 KByte, 4 KByte, 8 KByte, 16 KByte, 32 KByte, 64 KByte, 128 KByte, 256 KByte, 512 KByte, or 1,024 KByte. However, these are merely examples of memory unit capacity and are not limited to these examples.

In some examples, the capacity of each of the memory units of the variable memory 300 may be configurable. For example, the capacity of each memory unit of the variable memory 300 may be different from each other. For example, some memory units of the variable memory 300 may have a capacity of 4 KByte, while other memory units of the variable memory 300 may have a capacity of 32 KByte. However, these are merely examples of memory unit capacity and are not limited to these examples.

Optimal computation scheduling based on the variable memory 300 means that the utilization rate (%) of the variable memory 300 is maximized for each layer operation of the neural network model. Optimal computation scheduling refers to selecting caching entries in a way that maximizes caching benefits globally for each layer, each tile, or each tensor operation. If the utilization rate of the variable memory 300 is increased, more output feature map candidates may be cached, thereby improving memory efficiency. As a result, more data can be supplied faster from the variable memory 300 to the processing elements 400, reducing data starvation. Consequently, the frequency of data transfer between the variable memory 300 and the memory 3000 can be reduced.

When the overall capacity of the variable memory 300 is less than the size of the weights and feature maps of a layer that the NPU 1000 is to process, tiling of the weights or feature maps may be performed. The variable memory 300 may then store a tile of weights or features maps instead of the entire layer. In such cases, increasing the utilization rate of the variable memory 300 may have the effect of reducing the number of tiles that a layer is split into for processing by the NPU 1000.

The controller 100 may set the capacities of each of the weight memory, the input feature map memory, and the output feature map memory to be the same as each other in a first computation step of a particular neural network model, that is, the number of at least one memory unit comprising the weight memory, the number of at least one memory unit comprising the input feature map memory, and the number of at least one memory unit comprising the output feature map memory may be set to be the same in the first operation step.

In the second operation step following the first operation step, the capacity of each of the weigh memory, the input feature map memory, and the output feature map memory included in the variable memory 300 may be set differently. That is, the number of at least one memory unit comprising the weight memory, the number of at least one memory unit comprising the input feature map memory, and the number of at least one memory unit comprising the output feature map memory in the second operation step may each be different. The number of memory units allocated for each domain may vary according to the ratio of the sizes of the parameters for each domain associated with each operation step.

One operation step may be a step in which a plurality of processing elements 400 of the NPU 1000 process certain input feature map data and certain weight data stored in at least one memory unit of the variable memory 300. For example, the first operation step may correspond to computing a first layer of the neural network model. The second operation step may correspond to computing a second layer of the neural network model.

In another example, the first operation step may be a computation of a first tile of the first layer of the neural network model. The second operation step may be a computation of a second tile of the first layer of the neural network model.

In another example, the first operation step may be a computation of a first tensor of the first layer of the neural network model. The second operation step may be a computation of a second tensor of the first layer of the neural network model.

The compiler 3010 may be configured to determine the number of tiles for each layer based on the memory capacity of the variable memory 300 and the number of memory units of the NPU 1000, and the data size of the weights and feature maps for a particular layer of the neural network model. The size of the feature map and weights for each layer of the neural network model may be analyzed in a compilation step. The size of the feature maps and weights for each layer of the neural network model is determined by the structure of the neural network model. Accordingly, the machine code generated by the compiler 3010 may schedule operations of the NPU 1000 based on the information on the size of the feature maps and weights for each layer of the neural network model when processing a particular neural network model.

The controller 100 may be configured to control the DMA 200 and the variable memory 300 based on the analyzed computation scheduling information. The controller 100 may control the DMA 200 such that the DMA 200 manages read and write operations associated with the variable memory 300.

To process a particular neural network model, the compiler 3010 may generate machine code to efficiently schedule operations based on the structure of the neural network model and the memory capacity of the variable memory 300.

In particular, when the processing sequence of the layers in the neural network model, the size of the feature maps and weights for each layer are provided, the compiler 3010 may determine how to allocate the capacity of the weight memory and the capacity of the feature map memory in the NPU 1000. The NPU 1000 may operate according to a set scheduling sequence as defined in the complied machine code in the compilation stage, and does not perform separate operations for scheduling or allocating memory space in the variable memory 300 to the weights and feature maps during the runtime. Thus, the operation of the variable memory 300 of the NPU 1000 may be performed efficiently based on analysis of the weight size and feature map size of each layer of the neural network model. The information analyzed may be included in the machine code to be executed.

Figure 3:
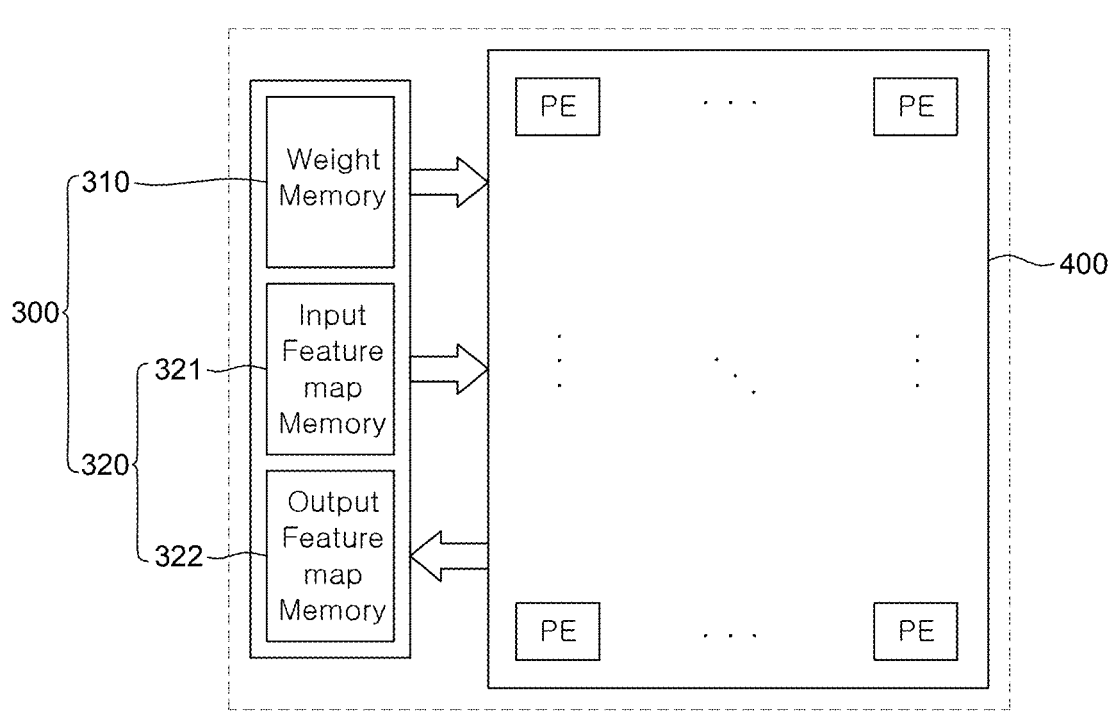
FIG. 3 is a drawing illustrating the configuration and operation of a specific memory unit included in the variable memory of the neural processing unit, according to one example of the present disclosure.

FIG. 3 is a drawing illustrating the configuration and operation of memory units included in the variable memory 300 of the NPU 1000, according to one example of the present disclosure. As previously described, at least one of the plurality of memory units may be allocated as a weight memory, an input feature map memory, or an output feature map memory. Referring to FIG. 3, the variable memory 300 may include a weight memory 310 and a feature map memory 320.

The weight memory 310 may be a plurality of memory units that store weights during a particular computation step, and the feature map memory 320 may be a plurality of memory units that store one of an input feature map and an output feature map during a particular computation step. The weight memory 310 may be referred to as the weight domain of the variable memory 300 while the feature map memory 320 may be referred to as the feature map domain of the variable memory 300.

For each layer of the neural network model, the ratio of memory space assigned to the weight memory 310 relative to memory space assigned to the feature map memory 320 may vary. In one or more embodiments, the number of memory units included in the weight memory 310 may vary and the number of memory units included in the feature map memory 320 may vary for each layer of the neural network model. The NPU 1000 may set the number of units in the weight memory 310 and the feature map memory 320 in response to domain-specific ratios of the parameters of the layers of the respective neural network model.

The capacity of each memory unit of the variable memory 300 may be configured to be the same. For example, the capacity of each memory unit of the variable memory 300 may be 1 KByte, 2 KByte, 4 KByte, 8 KByte, 16 KByte, 32 KByte, 64 KByte, 128 KByte, 256 KByte, 512 KByte, or 1,024 KByte, although examples of the present disclosure are not limited to the se sizes.

In other embodiments, the capacity of each memory unit of the variable memory 300 may be configurable. For example, the capacity of each of the memory units of the variable memory 300 may be different. For example, some of the memory units may have a capacity of 4 KByte, while other memory units may have a capacity of 32 KByte. However, the examples of the present disclosure are not limited to these capacities of the memory units.

Meanwhile, the NPU 1000 may control the capacity of each domain of the variable memory 300 based on the structure of the neural network model to be processed. The structure of the neural network model may include the number of layers of the neural network model, the sequence of operations in each layer, the sizes of the feature map and the weight of each layer, and the like. The size of the feature map of each layer may be subdivided into the size of the input feature map and the size of the output feature map, as described in detail below. The structure of the variable memory may indicate, among others, the number of the plurality of memory units, the capacity of each memory unit, and an address or identification code of each memory unit. Further, the structure of the variable memory may include domain information for each of the currently set memory units.

The feature map memory 320 may include an input feature map memory 321 and an output feature map memory 322. A feature map memory refers to memory units storing an input feature map and memory units storing an output feature map. In order to process a particular neural network model, the compiler 3010 may schedule operations based on the structure of the neural network model and the structure of the variable memory 300.

As will be described further, a memory unit may store data from one domain. However, the memory unit according to the examples of the present disclosure is not limited thereto, and the memory unit may store data of a plurality of domains. For example, a memory unit may have a capacity of 1,024 KByte. In this case, input feature map data of 512 KByte and output feature map data of 512 KByte may be stored in a memory unit. Further, when the variable memory is a dual-port SRAM, the memory unit may perform read operations and write operations simultaneously. Therefore, the input feature map may be read and the output feature map may be written simultaneously in a memory unit. Further, in order to simultaneously process the read operation and the write operation, the variable memory 300 may have a read multiplexer and a write multiplexer.

Furthermore, a memory unit may store data in the input feature map domain and data in the weight domain. In such a case, since the input feature map data and the weight data are to be read simultaneously from the same memory unit, the input feature map and the weight may be read sequentially every clock. Therefore, it may be more efficient to store input feature map data and output feature map data separately than to store input feature map data and weights together in a single memory unit. Accordingly, a compiler may generate machine code that avoids simultaneously storing input feature maps and weights in a single memory unit. For this purpose, the compiler can analyze the size of the data corresponding to each domain in each layer and avoid inefficient allocation of multiple domains to a memory unit. Additionally, when the variable memory 300 is singleport SRAM, the compiler may generate machine code configured to store only data of a single domain in one memory unit, if possible.

According to the present disclosure, the controller 100 may store data from a plurality of domains in a memory unit while arranging the data so that data residing in one of the at least one of the memory banks comprising the variable memory 300 is not accessed simultaneously, thereby increasing memory utilization and avoiding conflicts between memory banks to enable reliable memory operation. As such, the controller 100 may be configured to control the variable memory 300 according to structure of the neural network model contained in a binary file compiled for operation on the NPU 1000.

Figure 4:
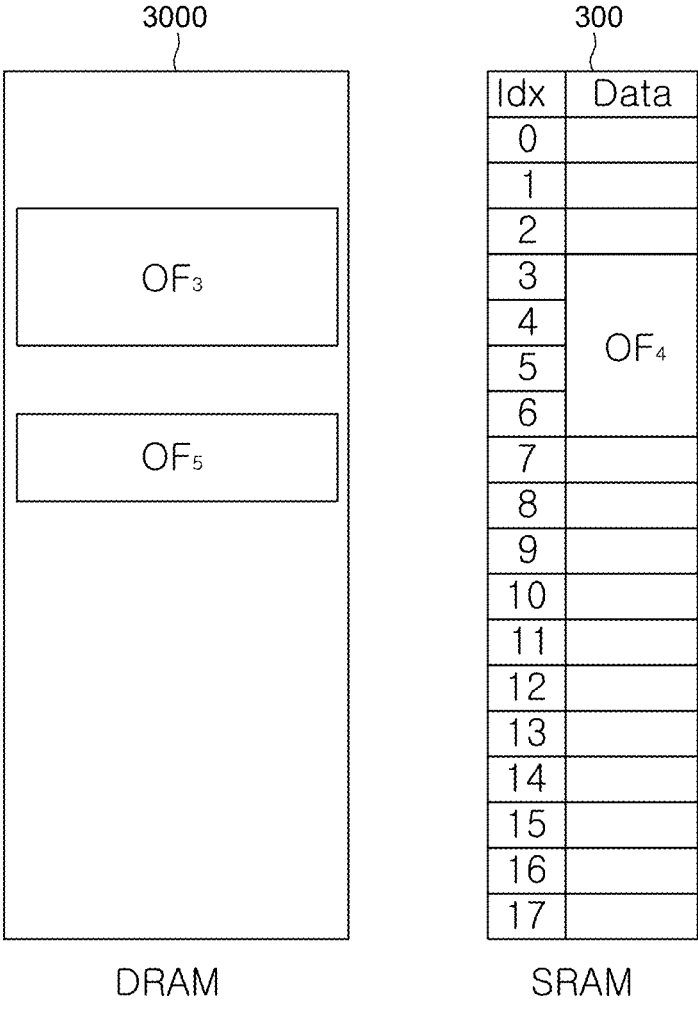
FIG. 4 is a drawing illustrating the internal configuration of the variable memory included in the neural processing unit, according to one example of the present disclosure.

FIG. 4 is a drawing illustrating the internal configuration of the variable memory 300 included in the NPU 1000, according to one example of the present disclosure. Referring to FIG. 4, the variable memory 300 is an SRAM comprising 18 memory banks, and the variable memory 300 includes data indexed from 0 to 17. Each data may be indexed in units of memory units. In some embodiments, the main memory 3000 may be embodied as DRAM.

The variable memory 300 or main memory 3000 may store data (e.g., input feature maps, output feature maps, weights) for computing the neural network model. In one example, the main memory 3000 may store the output feature map OF3 of the third layer and the output feature map OF5 of the fifth layer in different memory units at a particular point in time (e.g., at the time of computing the sixth layer). In the variable memory 300, the output feature map OF4 of the fourth layer may be stored in the third memory unit Idx3 to the sixth memory unit Idx6 at a certain point in time (e.g., at the time of the sixth layer operation). In this case, the size of the output feature map OF4 of the fourth layer is 4, and the "size of the output feature map" refers to the number of memory banks of the variable memory 300 that are occupied by data corresponding to the output feature map. At this time, the data to be stored in the variable memory 300 may be determined by determining the caching entries so that the caching gain is increased for each layer operation.

Figure 5:
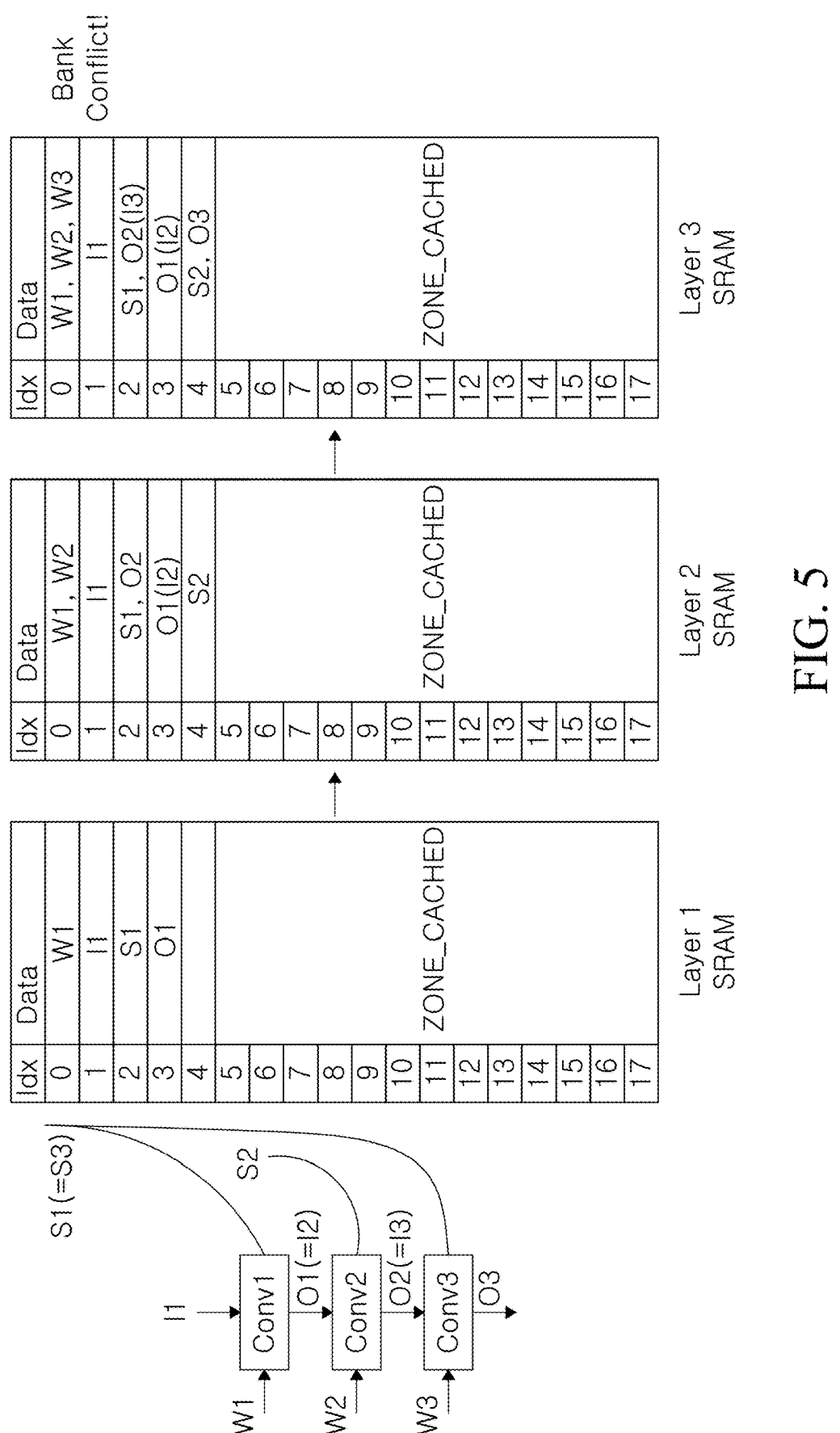
FIG. 5 is a drawing for illustrating one example of performing an operation in the variable memory, according to one example of the present disclosure.

FIG. 5 is a drawing for illustrating one example of performing an operation in the variable memory 300, according to one example of the present disclosure. Referring to FIG. 5, for the first layer operation Conv1, the weight data W1 of the first layer may be stored in the first memory unit Idx0, the input data I1 may be stored in the first memory unit Idx1, the first skip-connection data S1 may be stored in the second memory unit Idx2, and the output data O1 may be stored in the third memory unit Idx3.

Then, for the second layer convolution Conv2, the weight W2 of the second layer may be stored in the first memory unit Idx0, the input data I2 of the second layer may be stored in the third memory unit Idx3, the second skip-connection data S2 may be stored in the fourth memory unit Idx4, and the output data O2 of the second layer may be stored in the second memory unit Idx2.

The first memory unit Idx0 may have a capacity to store both the weight data W1 of the first layer and the weight data W2 of the second layer. Since the compiler 3010 is provided with information about the capacity of the first memory unit Idx0 and the size of the weighted data W1 of the first layer and the size of the weighted data W2 of the second layer during the compilation step, the compiler 3010 may generate machine code to control the variable memory 300 to store the weighted data W1 of the first layer and the weighted data W2 of the second layer together in the first memory unit Idx0. Further, the compiler 3010 may generate machine code to control the variable memory 300 to delete or overwrite the weight data W1 of the first layer after reading the weight data W1 of the first layer not reused in subsequent layers.

The input data I2 of the second layer corresponds to the output data O1 of the first layer, so that it can be reused without being deleted from the third memory unit Idx3. Since the compiler 3010 can determine in the compilation stage that the output data O1 of the first layer is substantially the same as the input data I2 of the second layer, the compiler 3010 can generate machine code to control the variable memory 300 to retain and reuse the output data O1 of the first layer in the second layer operation.

The output data O2 of the second layer may be stored in the second memory unit Idx2. Since the compiler 3010 is provided with the capacity of the second memory unit Idx2 and the size information of the first skip-connection data S1 and the output data O2 of the second layer in the compilation step, the compiler 3010 may generate machine code to control the variable memory 300 to store the first skip-connection data S1 and the output data O2 of the second layer together in the second memory unit Idx2.

Then, for the third layer operation Conv3, the weight W3 of the third layer may be stored in the first memory unit Idx0, the input data I3 of the third layer may be stored in the second memory unit Idx2, the third skip-connection data S3 may be stored in the second memory unit Idx2, and the output data O3 of the third layer may be stored in the fourth memory unit Idx4.

The first memory unit Idx0 may have a capacity to store entirety of the weight data W1 of the first layer, the weight data W2 of the second layer, and the weight data W3 of the third layer. Since the compiler 3010 is provided with the information of the capacity of the first memory unit Idx0 and the size of the weight data W1 of the first layer, the weight data W2 of the second layer, and the weight data W3 of the third layer during the compilation step, the compiler 3010 may generate machine code to control the variable memory 300 to store the weight data W1 of the first layer, the weight data W2 of the second layer, and the weight data W3 of the third layer together in the first memory unit Idx0. Further, the compiler 3010 may generate machine code to control the variable memory 300 to delete or overwrite the weight data W1 of the first layer and the weight data W2 of the second layer when the weight data W1 of the first layer and the weight data W2 of the second layer are provided with information that is not reused in subsequent layers.

The input data I3 of the third layer corresponds to the output data O2 of the second layer. Input data I3 may be reused as the output data O2, and hence, input data I3 may be reused without being deleted from the second memory unit Idx2. Since the compiler 3010 can determine during the compilation stage that the output data O2 of the second layer is substantially the same as the input data I3 of the third layer, the compiler 3010 can generate machine code to retain the input data I3 in the variable memory 300 to reuse the output data O2 of the second layer in the third layer operation.

The third skip-connection data S3 corresponds to the first skip-connection data S1. The first skip-connection data S1 may be reused as the third skip-connection data S3 without being deleting from the second memory unit Idx2. Since the compiler 3010 can determine at the compilation stage that the first skip-connection data S1 is substantially the same as the third skip-connection data S3, the compiler 3010 can generate machine code to retain the first skip-connection data S1 in the variable memory 300 to reuse it in the third layer operation.

The output data O3 of the third layer may be stored in the fourth memory unit Idx4. Since the compiler 3010 is provided with information about the capacity of the fourth memory unit Idx4 and the size of the second skip-connection data S2 and the output data O3 of the third layer in the compilation step, the compiler 3010 may generate machine code to control the variable memory 300 to store the second skip-connection data S2 and the output data O3 of the third layer together in the fourth memory unit Idx4.

The compiler 3010 described above can generate machine code that can improves the utilization rate of the variable memory 300, that is, the internal memory, of the NPU 1000 based on the number of memory units of the variable memory, the capacity of each memory unit, whether the parameters of a layer in the neural network model are reused, and the sequence of the layers.

Hereinafter, a conflict of memory banks that may occur when the compiler 3010 generates machine code for controlling the variable memory will be described. If the compiler 3010 determines that the third layer's input data I3 and the third skip-connection data S3 are to be stored in the same memory unit (e.g., the second memory unit Idx2) considering only the capacity of the memory unit, the memory unit may experience a bank conflict problem. As further explained, the input data I3 of the third layer and the third skip-connection data S3 are parameters of the same layer. Therefore, the processing element PE may receive and operate the input data I3 of the third layer and the third skip-connection data S3 simultaneously. In such a case, one memory unit cannot simultaneously provide the input data I3 and the third skip-connection data S3 to the processing element PE. That is, a single memory unit may not simultaneously read or store parameters of different domains (e.g., input feature map data, output feature map data, weight data, skip-connection data, etc.) for performing computation in a single layer in different memory units to avoid memory bank conflicts. When reading or writing data of different domains residing in the variable memory, simultaneous access to the memory units may be avoided to improve the processing speed of the NPU. Accordingly, a compiler 3010 according to examples of the present disclosure may generate machine code configured to avoid bank conflicts in the variable memory.

Further, the compiler 3010 may utilize a layer fusion algorithm that takes into account bank conflicts in variable memory when compiling the neural network model. Layer fusion algorithms are optimization techniques designed to improve the operation efficiency of a neural network model during inference by combining multiple operations into a single operation. Layer fusion algorithms can enable hardware acceleration of NPUs, which can improve the inference speed and energy efficiency of NPUs. For example, in a convolution neural network (CNN), multiple layers perform sequential operations such as convolution, batch normalization, and activation function. Each of these tasks is typically executed in a separate layer during inference. Layer fusion involves merging these sequential operations into a single combined operation. For example, convolution, batch normalization, and activation functions can be fused into a single operation. According to one example of the present disclosure, a compiler can generate machine code with layer fusion applied to a neural network model.

Tiling is a technique used to divide layer computations with large amounts of data into smaller, more manageable subregions called "tiles." Tiling allows the neural network model to process each subregions separately, reducing memory footprint and enabling parallel processing. When the compiler applies tiling to the computation of a neural network model based on variable memory, it can lead to unnecessary, repeated and redundant computations. Thus, utilizing tiling and layer fusion together can lead to some issues. For example, tile overlap means that neighboring tiles slightly overlap as support data to ensure that the borders of the tiles do not cause errors in the final output. This tile overlap allows the neural network model to handle edge features more accurately. However, when layers are fused, operations within these overlapping regions can be computed multiple times for each tile containing the overlap.

For example, in the context of layer fusion, a fusion operation (e.g., convolution+batch normalization+activation) may be applied to each tile, and overlap can cause the same region of the input to be processed multiple times by the same fusion operation, resulting in duplicative computations. Therefore, if the compiler generates machine code to split multiple tiles, each tile will have an overlapping tensor, resulting in duplicative operations on it. Accordingly, with the increase in the number of tiles divided, the more duplicative operations become, resulting in a decrease in performance. Embodiments further aim to reduce such duplicative operations.

To increase the tile size of the computation, grouping is performed to reduce the number of memory units represented by each hatching pattern, as described below with reference to FIG. 6. Accordingly, the number of tiles to perform the full layer fusion is naturally reduced, and the number of times the input feature maps or weights are loaded from the main memory 3000 into the variable memory 300 for the tile computation is also reduced. To this end, one example of the present disclosure presents an algorithm for allocating data blocks with input-output dependencies between layers into different memory banks.

Figure 6:
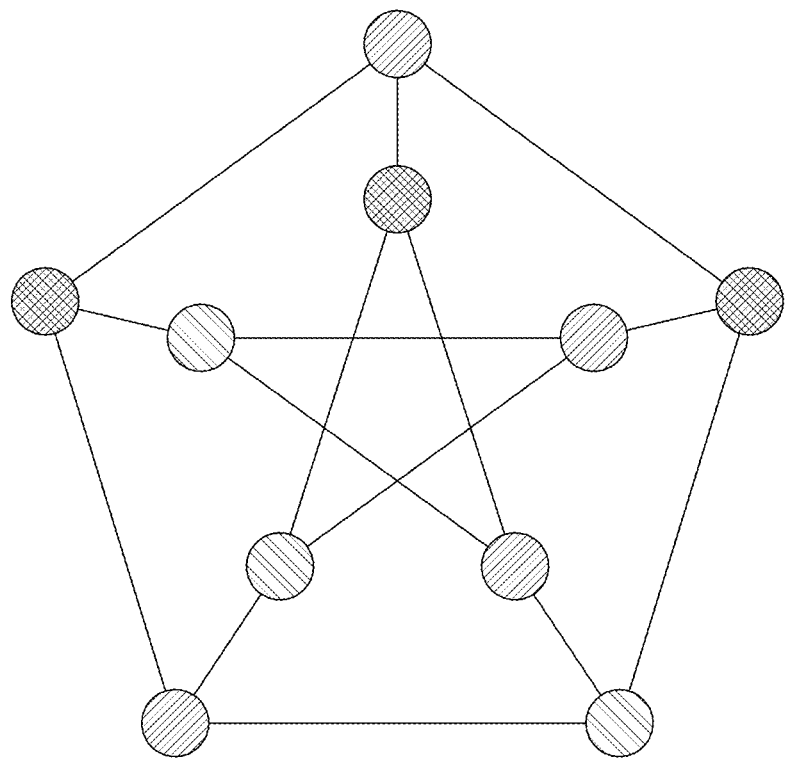
FIG. 6 is a drawing for illustrating an example of displaying the dependency relationship between each data based on a graph node, according to an example of this disclosure.

FIG. 6 is a drawing for illustrating an example of displaying the dependency relationship between each data based on a graphic node, according to an example of this disclosure. FIG. 6 is a drawing illustrating an example of a k-regular graph classified, according to one example of the present disclosure. In this example, a hatching pattern is used to visually classify each node, but this is only one example, and other methods, such as coloring, may be applied to classify. In other words, FIG. 6 is intended only to visually illustrate one example of the present disclosure and is not limited to the graph.

Referring to FIG. 6, the data is reduced to a k-regular graph using a preliminary labeling method, ensuring that each data element is represented as a graph node where the k of the k-regular graph can be defined as the minimum number of groups that will not cause a memory bank conflict when the data elements are stored in each group. That is, the input-output dependency relationships between the nodes are mapped accordingly. The preset display method can vary and enables the identification of adjacent graph nodes using patterning methods, indexing methods, and coloring methods. In FIG. 6, the patterning (i.e., hatching) method is illustrated as an example. However, the present disclosure is not limited thereto. The patterning method is an algorithm that detects the number of cases in which adjacent graph nodes are assigned different patterns using k number of patterns. The k-regular graph refers to a case in which each vertex in the graph is connected to exactly k other vertices, ensuring that all vertices have the same degree (i.e., the same number of connections).

Figure 7:
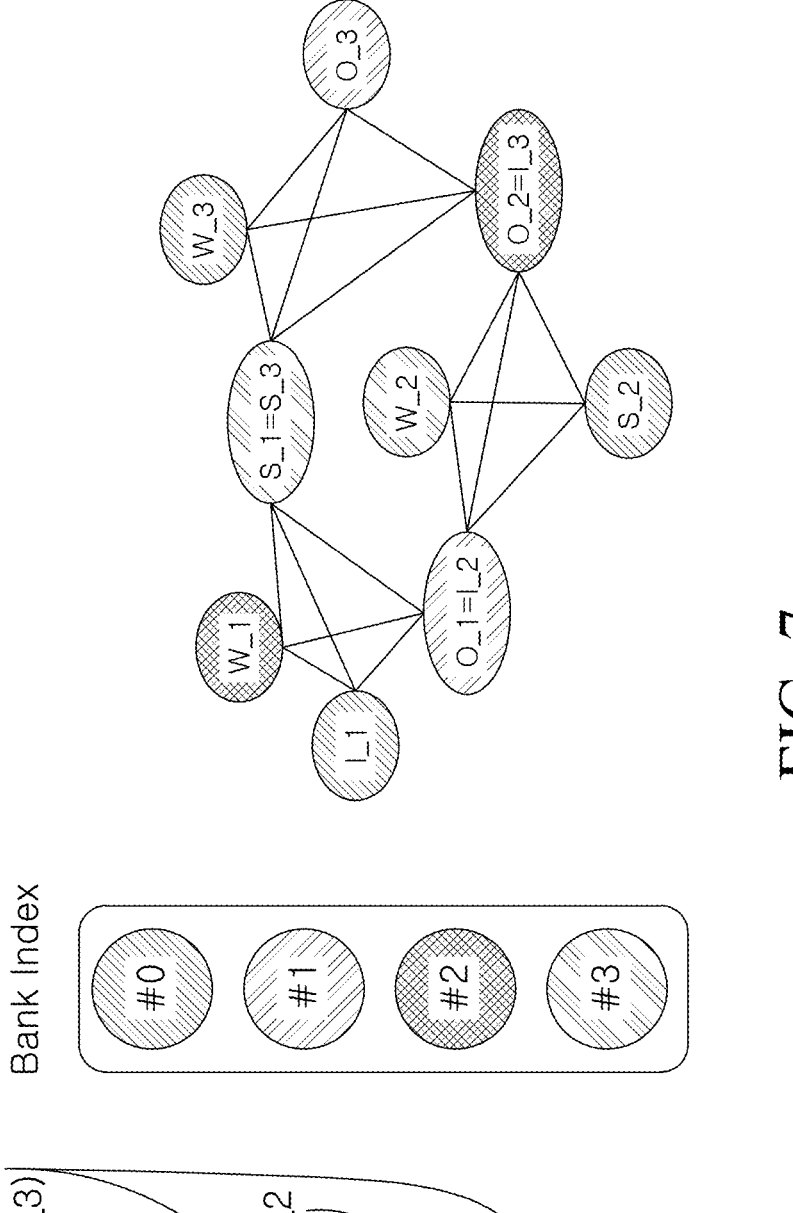
FIG. 7 is a drawing for illustrating an example of a k-regular graph classified, according to an example of this disclosure.

FIG. 7 is a drawing for illustrating an example of a k-regular graph classified according to an example of this disclosure. Referring to FIG. 7, input/output data blocks such as input values, output values, weights, and skip values, used in layer operations are represented as graph nodes. This representation allows for distinct expressions to be assigned to the connected data blocks, enabling their allocation to different memory banks. In other words, different representation methods may be applied to each memory bank, serving as criteria for data block allocation within the memory banks. The representation method may include color, patterns, shapes, or indexing, and for descriptive convenience, FIG. 7 illustrates an example where the patterning method is applied. In other words, in the following description, patterns are applied based on the allocation of memory banks. However, this is merely one example, and other representation methods, such as color or shape, may also be applied, and the present disclosure is not limited thereto.

Since data blocks assigned to the same pattern do not require simultaneous access, they do not cause memory bank conflicts. Therefore, the data blocks assigned to the same pattern will not be accessed simultaneously, thereby avoiding memory bank conflicts. Thus, such data blocks having the same pattern can be stored in the same memory bank. However, this approach is not the only valid solution, other approaches may also be adopted depending on the architecture or application. Therefore, among multiple valid data allocation criterions in a layer fusion, a selection criterion may be applied to determine the better allocation criterion.

Specifically, all possible candidate allocations (i.e., combinations) for allocating data blocks to each memory bank are examined, and one candidate is selected based on a predefined criterion. This allows data blocks to be allocated into memory banks according to the selected candidate allocation. The predefined criterion may be one of the following: (1) duplicity in clustering results (first criterion), (2) exceeding the storage capacity of each memory bank (second criterion), or (3) the number of SRAM copy operations required (third criterion).

If the first criterion is applied, when clustering data represented by nodes marked with the same pattern (e.g., hatching), duplicate graph solutions are eliminated. For example, if weight values W1, W2, and W3 are marked with a first pattern or a second pattern but represent the same candidate allocation despite different pattern markings, candidate allocations are identical to each other, and hence, one of the duplicate candidate allocations can be discarded.

If the second criterion is applied, when only graphs of unique candidate allocations remain, the number of memory banks for each pattern is determined. A candidate that does not exceed the threshold for specific memory capacity is selected as the final candidate allocation. Since the required number of memory banks depends on how the data is clustered, candidate allocations that reduce memory usage are prioritized.

If the third criterion is applied, the candidate allocations that reduces SRAM copy operations during the layer fusion process is selected. Specifically, as layer fusion is processed, the memory requirements for each data block may change, leading to fragmentation within the memory banks for each pattern. For example, if certain data block for a previous layer operation becomes unnecessary in the next layer, the corresponding memory space is left unused. To allocate space for a new data block, these fragmented empty spaces should be consolidated into contiguous memory space. During this process, SRAM copy operations, for moving one data block stored in one memory bank to another memory bank for consolidation, are performed within the memory to rearrange the data efficiently. The candidate allocation is determined by identifying the allocations that reduces the number of SRAM copy operations. In particular, in the case of the third criterion (reducing SRAM copies), the third criterion is orthogonal to the second criterion. When selecting a data allocation algorithm that reduces the number of SRAM copies, if multiple final candidate allocations exist, any selected candidate allocations yield the same performance.

Figure 8:
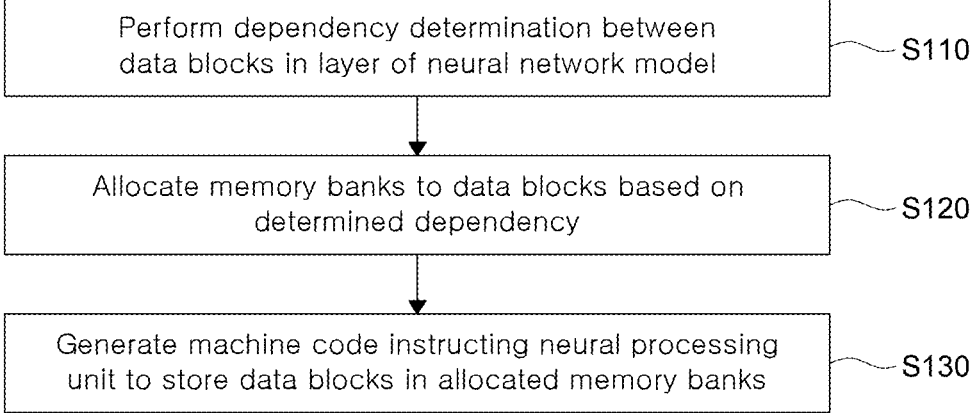
FIG. 8 is a flowchart for illustrating a method for controlling a data-allocatable neural processing unit, according to an example of this disclosure.

FIG. 8 is a flowchart for illustrating a method for controlling a data-allocatable NPU, according to an example of this disclosure. Referring to FIG. 8, the controller 100 performs S110 a dependency determination between data blocks in a specific layer of the at least one neural network model.

Specifically, a compiler executed by the CPU 2000 may analyze a relationship of data blocks based on an input-output dependency between data blocks and automatically determine the dependency relationship between data blocks. The analyzed relationships may be visually displayed for the purpose of, for example, debugging, optimization and/or validation by users. the analyzed relationships to facilitate At this time, based on the analyzed relationships, the compiler may determine that the neighboring data blocks are dependent. For example, the compiler may display the input-output dependencies between the data using a graph node to display the relationship between the data blocks, and the graph node illustrated in FIG. 7 is one example of such a graph node. The graph node may display both data blocks that are in a dependency relationship as well as data blocks that are not in a dependency relationship, and may include nodes corresponding to each data block, and edges corresponding to input-output dependencies between each data block.

Next, the compiler allocates S120 memory banks to store the data blocks based on the determined dependency between data blocks. To this end, the compiler first identifies a data block having a dependency relationship based on the dependency determined at step S110, and allocates the identified data blocks in different memory banks. At this time, the compiler may indicate each data block allocated to each memory bank. For example, when the dependency determination result is represented in the form of the graph node as shown in FIG. 7, the compiler may display the allocation status by applying a different pattern as an expression method corresponding to each memory bank for a node corresponding to each data.

In one example, the compiler may display a relationship using graph nodes based on an input-output dependency between the data blocks, calculate a required number of memory banks considering the size of the data block for each node, and identify at least one candidate allocation that may be applied to allocate the data block to each node based on the calculated number of memory banks. Thereafter, the compiler may use one or more criterion to select a candidate allocation, among candidate allocations, and may allocate the data block to each memory bank according to the selected candidate allocation.

In this case, the preset criterion can be any of the following: whether the clustering result is duplicative, whether the storage space of each memory bank is exceeded, and the number of SRAM copy operations, according to the candidate allocations.

The pattern applied to each node is only to avoid allocating conflicting data blocks together in one memory bank and is not limited thereto, so if the first criterion is preset, any candidate allocations can be selected by clustering to eliminate duplicative candidate allocations.

On the other hand, if the second criterion is preset among the preset criteria described above, any one of the candidate allocations can be selected by checking that the size of each data block does not exceed the storage space (i.e., capacity) of each memory bank.

Furthermore, if the third criterion is preset, since each data block has a different lifetime, any one of the candidate allocations can be selected by checking the candidate that has a small number of SRAM copies, for example, the fewest number of SRAM copies.

Next, the compiler generates S130 machine code instructing the NPU 1000 to, among others, store each of the data block in the allocated memory bank.

As described above, according to the example of this disclosure, data with input-output dependencies between layers can be allocated in different memory banks to avoid conflicts between memory banks, thereby reducing unnecessary computing cycle consumption.

According to an example of the present disclosure, a method for controlling a data allocatable NPU may be provided. The method may comprise determining a dependency determination between data blocks of a specific layer of at least one neural network model, allocating memory banks to store the data blocks based on the dependency determination, and storing each data block in the allocated memory bank.

In one or more embodiments, the determining the dependency determination between the data blocks may comprise analyzing a relationship based on an input-output dependency between the data blocks, and determining a dependency for neighboring data blocks based on the relationship.

In one or more embodiments, relationships between the data blocks in terms of data dependency are represented using a graph node based on an input-output dependency between the data blocks. The graphic node may include nodes corresponding to the data blocks and an edge corresponding to the input-output dependency between the data blocks.

In one or more embodiments, the allocating memory banks to store the data blocks may comprise determining the data blocks having a dependency based on the dependency determination, and allocating the data blocks that are determined to different memory banks.

In one or more embodiments, the allocating memory banks to store the data blocks may comprise displaying an allocation status for a node corresponding to each data block by applying a representation corresponding to each memory bank when the dependency determination is represented in the form of a graph node.

In one or more embodiments, the representation may include at least one of a color, a pattern, a shape, or an index.

In one or more embodiments, the allocating memory banks to store the data blocks may comprise displaying a relationship using a graph node based on an input-output dependency between the data blocks, calculating a number of memory banks by considering a size of the data blocks for each node, identifying one or more possible candidate allocations for the data block of each node based on the calculated number of memory banks, selecting a candidate allocation based on predefined criteria among the one or more identified candidate allocations, and allocating the data blocks in each memory bank according to the selected candidate allocation.

In one or more embodiments, the allocating memory banks to store the data blocks may comprise allocating the data block in each memory bank based predefined criteria. The predefined criteria may include at least one of: redundant clustering results, exceeding storage capacity of each memory bank, and a number of SRAM copy operations.

According to an example of the present disclosure, an NPU may be provided. The NPU may comprise a main memory configured to store data blocks of at least one neural network model, a variable memory configured to selectively store the data blocks of the at least one neural network model to at least one memory unit of a plurality of memory units, and a controller configured to determine a dependency determination between data blocks of a specific layer of at least one neural network model, allocate memory banks to store the data blocks based on the dependency determination, and store each data block in the allocated memory bank.

In one or more embodiments, when determining the dependency determination between the data blocks, the controller may be configured to analyze a relationship based on an input-output dependency between the data blocks, and determine a dependency for neighboring data blocks based on the relationship.

In one or more embodiments, when determining the dependency determination between the data blocks, the controller may be configured to display a relationship using a graph node based on an input-output dependency between the data blocks. The graphic node may include nodes corresponding to the data blocks and an edge corresponding to the input-output dependency between the data blocks.

In one or more embodiments, when allocating memory banks to store the data blocks, the controller may be configured to determine the data blocks having a dependency based on the dependency determination, and allocate the data blocks that are determined to different memory banks.

In one or more embodiments, when allocating memory banks to store the data blocks, the controller may be configured to display an allocation status for a node corresponding to each data block by applying a representation corresponding to each memory bank when the dependency determination is represented in the form of a graph node.

In one or more embodiments, the representation may include at least one of a color, a pattern, a shape, or an index.

In one or more embodiments, when allocating memory banks to store the data blocks, the controller may be configured to display a relationship using a graph node based on an input-output dependency between the data blocks, calculate a number of memory banks by considering a size of the data blocks for each node, identify one or more possible candidate allocations for the data block of each node based on the calculated number of memory banks, select a candidate allocation based on predefined criteria among the one or more identified candidate allocations, and allocate the data blocks in each memory bank according to the selected candidate allocation.

In one or more embodiments, when allocating memory banks to store the data blocks, the controller may be configured to allocate the data block in each memory bank based predefined criteria. The predefined criteria may include at least one of: redundant clustering results, exceeding storage capacity of each memory bank, and a number of SRAM copy operations.

The examples of the present disclosure shown herein and in the drawings are given for the purpose of illustrating the technical content of the present disclosure and to provide specific examples to facilitate understanding of the present disclosure, and are not intended to limit the scope of the disclosure. It will be apparent to one of ordinary skill in the art to which this disclosure belongs that other modifications based on the technical ideas of the invention may be practiced in addition to the examples disclosed herein.

[National research and development project that supported this invention]
[Task Identification Number] 2710007843
[Assignment number] 00228938
[Task Number] Ministry of Science and ICT
[Name of project management (professional) organization] Korea Information and Communication Planning and Evaluation Institute
[Research project name] Artificial intelligence semiconductor SW integrated platform technology development
[Research project name] Commercial edge AI SoC semiconductor SW development platform technology development
[Contribution rate] 1/1
[Name of project carrying out organization] DEEPX CO., LTD.
[Research period] 2025.01.01~2025.12.31

What is claimed is:

1. A method for compiling machine code to operate a neural processing unit, the method comprising:
   determining dependency between data blocks of a layer of a neural network model using a graph, the data blocks including data of at least two domains in the layer of the neural network model, each of nodes of the graph representing each of the data blocks, and each of edges of the graph representing an input-output dependency between the data blocks;
   allocating memory banks in the neural processing unit to the data blocks to prevent access conflict associated with the data blocks according to the determined dependency between the data blocks; and
   generating the machine code instructing the neural processing unit to store the data blocks in the allocated memory banks.

2. The method of claim 1, wherein the determining the dependency comprises:
   analyzing relationships of the data blocks based on the input-output dependency between the data blocks;
   representing the relationships of the data blocks as the graph; and
   determining the dependency of the data blocks based on neighboring of the data blocks in the graph.

3. The method of claim 1, wherein the allocating memory banks comprises:
   determining data blocks having dependency according to the graph; and
   allocating the data blocks having the dependency to different ones of the memory banks.

4. The method of claim 1, wherein the allocation of the memory banks is indicated by at least one of a color, a pattern, a shape, or an index.

5. The method of claim 1, wherein allocating the memory banks to the data blocks comprises:
   determining a number of memory banks for storing the data blocks based on a size of the data blocks for each node of the graph;

identifying candidate allocations for the data blocks to each node based on the determined number of memory banks;

selecting one of the candidate allocations from the identified allocation candidates based on predefined criteria; and allocating the data blocks to the memory banks according to the selected candidate allocation.

6. The method of claim 1, wherein the allocating memory banks to the data blocks comprises:

allocating each of the data blocks to each of the memory banks based on predefined criteria, wherein the predefined criteria include at least one of: duplicative clustering results, exceeding storage capacity of each memory bank, and a number of memory copy operations.

7. The method of claim 1, wherein each of the data blocks stores at least one of activation parameters, feature map parameters, KV cache parameters, attention parameters, an input feature map, an output feature map, or weights.

8. A neural processing unit comprising:

a main memory configured to store data blocks associated with a neural network model, the data blocks including data of at least two domains in a layer of the neural network model;

a variable memory comprising memory banks; and a controller configured to:

execute allocation of the memory banks to the data blocks based on dependency of the data blocks determined using a graph with nodes, each of the nodes representing each of the data blocks, and edges of the graph representing an input-output dependency between the data blocks, and cause the variable memory to store each of the data blocks in each of the allocated memory banks to prevent access conflict associated with the data blocks.

9. The neural processing unit of claim 8, wherein the dependency of the data blocks is determined by:

analyzing relationships of the data blocks based on the input-output dependency between the data blocks;

representing the relationships of the data blocks as the graph; and determining the dependency of the data blocks based on neighboring of the data blocks in the graph.

10. The neural processing unit of claim 8, wherein data blocks having dependency are allocated to different memory banks.

11. The neural processing unit of claim 8, wherein the allocation is indicated by at least one of a color, a pattern, a shape, or an index.

12. The neural processing unit of claim 8, wherein the memory banks are allocated to the data blocks by:

determining a number of memory banks for storing the data blocks based on a size of the data blocks for each node of the graph;

identifying candidate allocations for the data blocks to each node based on the determined number of memory banks;

selecting one of the candidate allocations from the identified allocation candidates based on predefined criteria; and allocating the data blocks to the memory banks according to the selected candidate allocation.

13. The neural processing unit of claim 8, wherein the memory banks are allocated to the data blocks by allocating each of the data blocks to each of the memory banks based on predefined criteria, wherein the predefined criteria include at least one of: duplicative clustering results, exceeding storage capacity of each memory bank, and a number of memory copy operations.

14. The neural processing unit of claim 8, wherein each of the data blocks stores at least one of activation parameters, feature map parameters, KV cache parameters, attention parameters, an input feature map, an output feature map, or weights.

15. A non-transitory computer-readable storage medium storing instructions thereon, the instructions when executed by one or more processors cause the one or more processors to:

determine dependency between data blocks of a layer of a neural network model using a graph, the data blocks including data of at least two domains in the layer of the neural network model, each of nodes of the graph representing each of the data blocks, and each of edges of the graph representing an input-output dependency between the data blocks;

allocate memory banks in a neural processing unit to the data blocks to prevent access conflict associated with the data blocks according to the determined dependency between the data blocks; and generate machine code instructing the neural processing unit to store the data blocks in the allocated memory banks.

16. The non-transitory computer-readable storage medium of claim 15, wherein each of the data blocks stores at least one of activation parameters, feature map parameters, KV cache parameters, attention parameters, an input feature map, an output feature map, or weights.

* * * * *